(12) United States Patent
Kotha

(10) Patent No.: US 11,157,638 B1
(45) Date of Patent: Oct. 26, 2021

(54) METHODS AND SYSTEMS FOR EASY AND SECURE PRINTING AT KIOSKS WITHOUT ANY USER INTERVENTION

(71) Applicant: XEROX CORPORATION, Norwalk, CT (US)

(72) Inventor: Surya Prakash Kotha, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/023,671

(22) Filed: Sep. 17, 2020

(51) Int. Cl.
*G06F 21/60* (2013.01)
*G06F 3/12* (2006.01)

(52) U.S. Cl.
CPC .......... *G06F 21/608* (2013.01); *G06F 3/1209* (2013.01); *G06F 3/1224* (2013.01); *G06F 3/1238* (2013.01); *G06F 3/1268* (2013.01); *G06F 3/1286* (2013.01)

(58) Field of Classification Search
None
See application file for complete search history.

(56) References Cited

U.S. PATENT DOCUMENTS

| | | | |
|---|---|---|---|
| 2005/0091343 A1* | 4/2005 | Murray, Jr. | H04N 1/00222 709/219 |
| 2006/0279768 A1* | 12/2006 | Wang | H04N 1/4426 358/1.15 |
| 2007/0035763 A1* | 2/2007 | Bard | G06Q 20/10 358/1.15 |
| 2007/0201048 A1* | 8/2007 | DuBois | G06F 3/1288 358/1.1 |
| 2009/0225334 A1* | 9/2009 | Takamiya | G06F 3/1219 358/1.9 |
| 2016/0055477 A1* | 2/2016 | Guerin | G07F 9/001 705/21 |

* cited by examiner

*Primary Examiner* — Dov Popovici

(57) ABSTRACT

The methods and systems for direct printing at kiosks. The method includes: at an application accessible at a computing device: receiving a document from a user for printing and one or more print attributes. At a server communicatively coupled to the application, the method includes: calculating and displaying a cost for the printing the document based on the print attributes; providing a user interface to the user to input payment details; validating the payment details; encrypting the document with the payment details; and allowing the user to download the encrypted document in the form of a print job to a portable storage device. At a print workflow running at a kiosk, the method includes: receiving the portable storage device including the encrypted job; reading and decrypting the encrypted print job; and printing the job directly at the kiosk without requiring any input from the user.

23 Claims, 8 Drawing Sheets

METHODS AND SYSTEMS FOR EASY AND SECURE PRINTING AT KIOSKS WITHOUT ANY USER INTERVENTION

TECHNICAL FIELD

The presently disclosed subject matter relates to the field of printing, and more particularly to methods and systems for direct printing at kiosks without any user intervention.

BACKGROUND

At present, a user who wants to print a document, the first copies the document to a USB or cloud drive, the walks up to a kiosk where he may login into his cloud account if his job is in cloud providers (Google Drive, Dropbox™ or other cloud locations), and selects the document for printing. Then, the user requires to enter payment information and finally submits the document for printing. The kiosk validates the payment information and prints the document. There may be scenarios where the user may not be comfortable providing payment information at the kiosk as kiosks are public devices to be used by multiple users. Sometimes, scrolling or browsing through folders in the kiosk's user interface is also difficult. And additionally, adding new payment types in the kiosk is difficult as payment providers have to take all necessary certifications and hence it is time consuming task overall. In view of the above, there is a need for improvised methods and systems for printing at kiosks.

SUMMARY

According to aspects illustrated herein, a method for direct printing at kiosks is disclosed. At an application accessible at a computing device, the method includes receiving a document from a user for printing and one or more print attributes to configure the document for printing. At a server communicatively coupled to the application, the method includes: calculating and displaying a cost for the printing the document based on the one or more print attributes; providing a user interface to the user to input payment details; validating the payment details as received from the user; encrypting the document with the payment details; and allowing the user to download the encrypted document in the form of a print job to a portable storage device. At a print workflow running at a kiosk, the method includes: receiving the portable storage device including the encrypted print job: reading the encrypted print job stored in the portable storage device; decrypting the print job; and upon successful decryption, printing the job directly at the kiosk without requiring any input from the user.

According to further aspects illustrated herein, a system includes an application, a server in communication with the application and a print workflow running on the kiosk. The application is accessible at a computing device to: receive a document from a user for printing and one or more print attributes to configure the document for printing. The server is to: calculate and display a cost for the printing the document based on the one or more print attributes; provide a user interface to the user to input payment details; receive and validate the payment details received from the user: encrypt the document with the payment details; and allow the user to download the encrypted document with the payment details in the form of a print job to a portable storage device. The print workflow running on the kiosk is to: receive the portable storage device including the encrypted print job and the payment details; read the encrypted print job stored in the portable storage device; decrypt the print job; and upon successful decryption, print the job directly at the kiosk without requiring any input from the user.

According to additional aspects illustrated herein, a system is disclosed. The system includes an application accessible at a computing device to: receive a document from a user for printing and one or more print attributes to configure the document for printing. The system includes a server in communication with the application to: calculate a cost for the printing the document based on the one or more print attributes; provide a user interface to input payment details; validate the payment details received from the user; generate a code for the print job; upload the print job to a cloud storage. The system includes a print workflow running on a kiosk, the kiosk is to: receive the code from the user to access the print job; and download and print the job at the kiosk without requiring any input from the user.

A non-transitory computer-readable medium including instructions executable by a processing resource to: at an application accessible at a computing device: receive a document from a user for printing along with one or more print attributes to configure the document for printing; calculate and display a cost for the printing the document based on the one or more print attributes: provide a user interface to the user to input payment details; validate the payment details received from the user; encrypt the document with the payment details; and allow the user to download the encrypted document with the payment details in the form of a print job to a portable storage device; and at a print workflow running at a kiosk; receive the portable storage device including the encrypted print job and the payment details; read the encrypted print job stored in the portable storage device; decrypt the print job; and print the job directly at the kiosk without requiring any input from the user.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
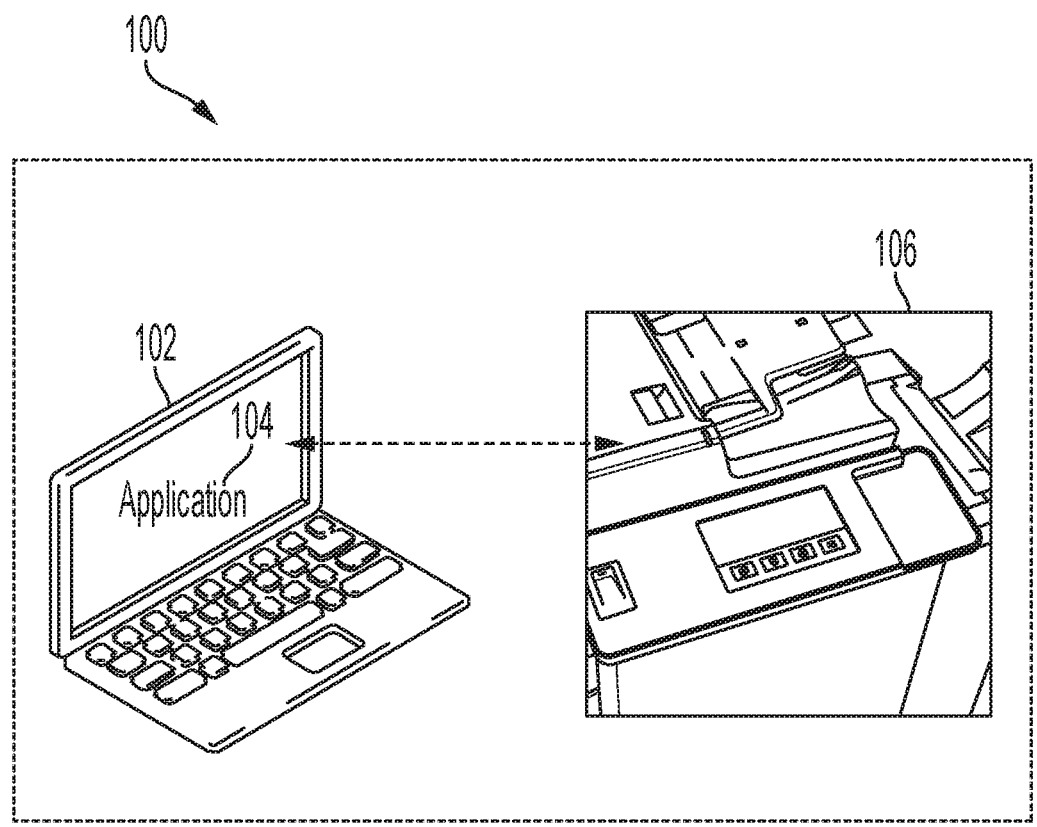
FIG. 1 shows an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims, Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

The term "kiosk" refers to a standalone device placed in public places such as retail environments for printing, scanning, copying, imaging or other functionalities that are typically included in a multi-function device. As used herein, a "multi-function device" is a single device or a combination of multiple devices, to perform one or more functions such as, but not limited to, printing, imaging, scanning, copying, and so forth. In the context of the current disclosure, the kiosk prints a document (or a print job) without requiring any user intervention/input at the time of printing i.e., without requiring any payment details or personal details from a user at the kiosk.

The term "document" refers to any document including one or more pages. The document can be in a virtual or software form (embodied in a software file). The virtual form can also be referred to as digital form, electronic version, or the like.

The term "application" refers to a program that allows the user to submit a document for printing and to submit one or more print attributes for configuring the document for printing. The application may be in the form of a mobile app running on a mobile device, a desktop application running on a desktop, a web application running in a web browser on a computing device. The application may be communicatively coupled to a server. The server receives the document, print attributes from the application and performs one or more functionalities such as calculating a cost for printing; payment validation, cost reconciliation or the like.

The "print workflow" refers to a workflow running on a kiosk such that the workflow receives the document, validates the print job, and prints the print job without any user intervention/inputs. The print workflow communicates with the server in real-time.

The term "computing device" refers to a device that a user typically uses for giving print commands and other purposes. Examples of the computing device include, but are not limited to, a personal computer, a desktop; a laptop, a mobile phone, a tablet, a Personal Digital Assistant (PDA), a smart-phone or any other device capable of data communication. In context of the present disclosure, the computing device has an application running on it that allows the user to submit the document for printing, one or more print attributes and one or more other functions.

Overview

The present disclosure provides methods and systems for simplified, direct, and secure printing at kiosks. The methods and systems include—(i) an application may be a web application hosted in the Internet, a mobile app or desktop application, (ii) a server communicatively coupled to the application, a print workflow running in the kiosk that interacts with the server in real-time.

The methods and systems allow a user to submit a document for printing via an application. For example, the application may be a desktop application or a mobile application. The user accesses the application and configures the document for printing. The document and its configuration are sent to a back-end of the application for further processing, for example, a server. The server calculates a cost for printing the document, the user pays the cost for printing via the application and then downloads the document in form of a print job to a personal storage device. The downloaded job is then accessed by the user at the kiosk. The kiosk directly prints the document without requiring any user input/intervention i.e., without requiring any payment or personal details from the user at the kiosk. In some implementations, the print job may be stored at a cloud. In such implementations, the server provides a code to the user may be in the form of job ID, job code, a OR code or the like. The user accesses the kiosk, provides the code at the kiosk and the job is downloaded from the cloud at the kiosk. Finally, the kiosk prints the job without any user input at the kiosk.

Exemplary Environment

FIG. 1 shows an exemplary environment 100 in which various embodiments of the disclosure can be practiced. The environment 100 includes a computing device 102 and a kiosk 106. A user typically uses the computing device 102 for his daily tasks such as emails, surfing, work, chatting, prints etc. Examples of the computing device 102 include, but are not limited to, a personal computer, a laptop, a mobile phone, a tablet, a Personal Digital Assistant (PDA), a smart-phone or any other device capable of data communication. The computing device 102 and the kiosk 106 collectively forms a system.

The computing device 102 runs several applications and software for functioning of the computing device 102. In context of the present disclosure, the computing device 102 includes an application 104 allowing a user to submit a document for printing and configure the document for printing. The application 104 is communicatively coupled to a server for further processing. The application 104 may be a desktop application, a mobile application, or a web application. For example, if the computing device 102 is a mobile phone, then the application 104 may be in the form of a mobile application. In another example, if the computing device 102 is a desktop or a personal computer, the application 104 may be in the form of a web application or in the form of a desktop application. In case the application 104 is in the form of a web application, the user requires to access a URL of the application and open the application in any browser, for example, Google chrome, Microsoft Internet browser or the like. The application 104 can be considered having a front-end and a back-end, where the front-end can be in the form of a user interface that allows the user to perform a number of functionalities such as submitting a document, submitting parameters for printing, inputting payment details and further displays information to the user such as cost details, status etc. The back-end can be in the form of a server that receives the information from the front-end, performs processing and sends results back to the front-end. For example, the server calculates a cost for printing, validates payment details through the third party, interacts with print workflow, reconciles cost, and so on.

As shown, the kiosk 106 runs several applications such as scan workflow, payment workflow. In context of the present application, the kiosk 106 runs a print workflow. The print workflow communicates with the server such that the application is updated in real-time.

According to the environment 100, the user submits a document via the application 104, submits one or more print parameters via the application 104, back-end of the application 104 i.e., server calculates a cost for printing, the user confirms the cost, completes the payment at the application 104 itself, and downloads the printable format of the document in his personal device or the document is uploaded to a cloud storage device. The user walks up to the kiosk 106, accesses the print workflow and prints the document directly at the kiosk 106 without any further input. This way, the disclosure facilitates secure and direct printing at kiosks, where the user does not require to input any payment details or other personal details at the kiosk 106. More details will be discussed below.

Exemplary System

Figure 2:
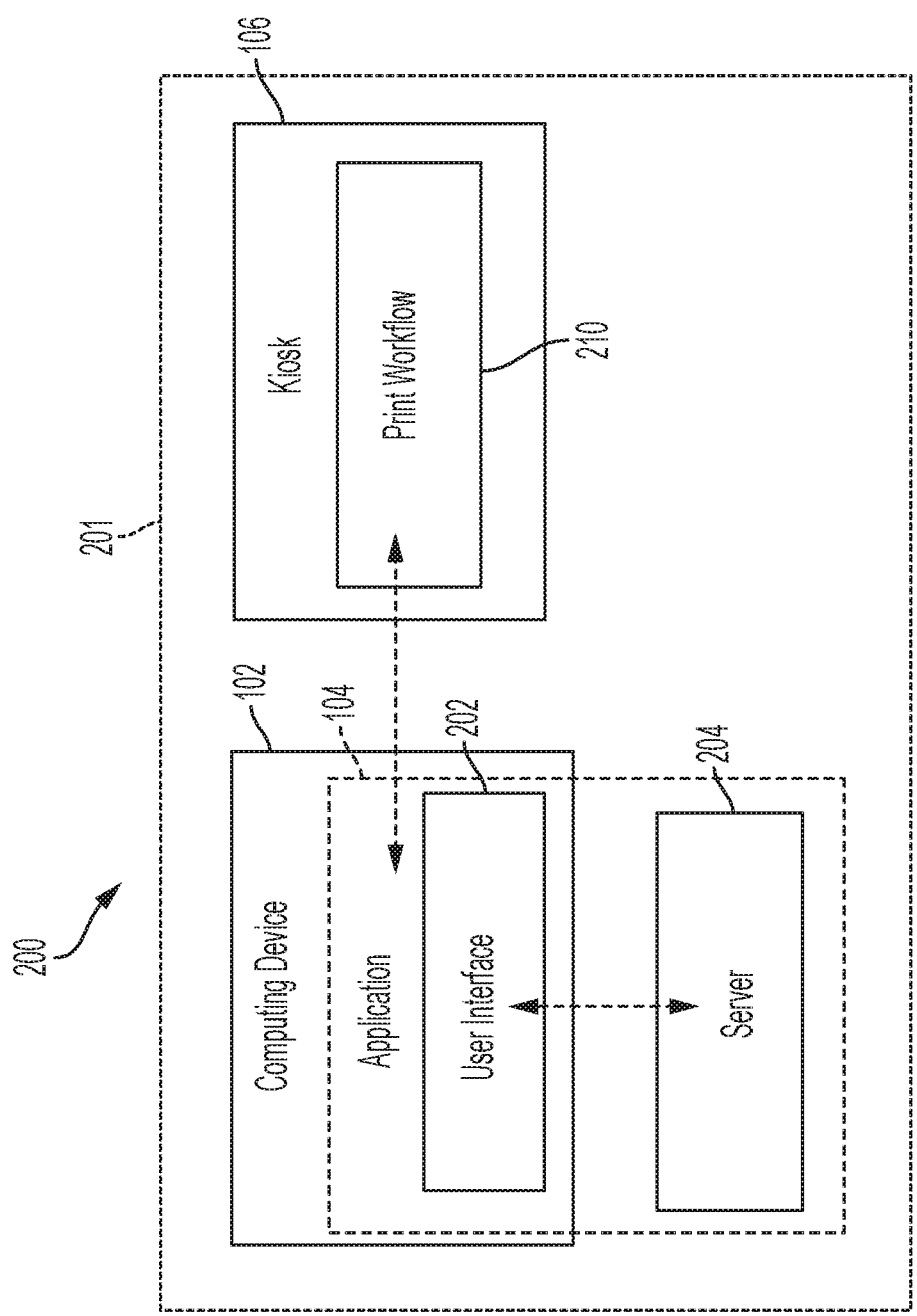
FIG. 2 is a block diagram illustrating various system components of a system, in accordance with an embodiment of the present disclosure.
Figures 3A, 3B:
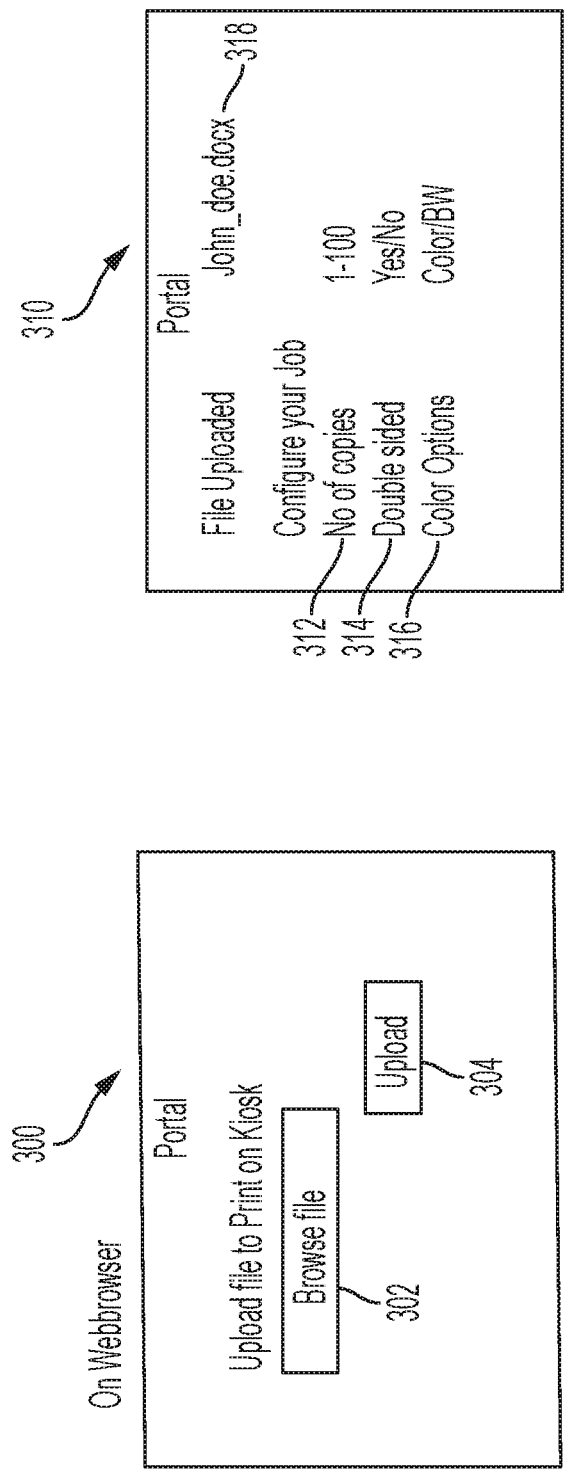
FIGS. 3A, 3B, 3C, and 3D show exemplary snapshots.
Figures 3C, 3D:
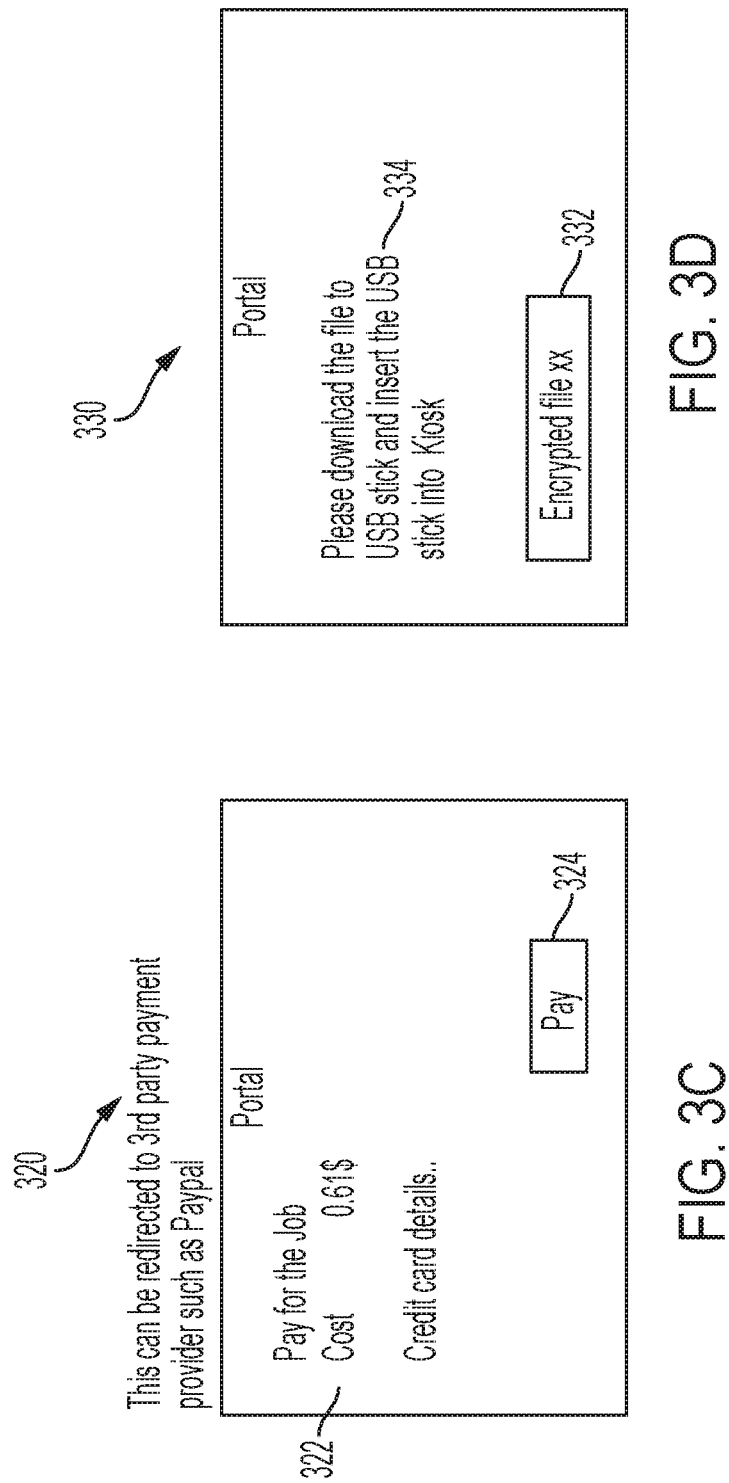

FIG. 2 is a block diagram 200 illustrating various components of a system 201 including a computing device 102 having an application 104 and a kiosk 106 having a print workflow 210 running on the kiosk 106. Each of the components 102 and 104 is connected to each other via a conventional bus or a later developed protocol. Similarly, each of the components 106 and 210 is connected to each other via a conventional bus or a later developed protocol. Further, each of the components 102, 104, 106, 210 and others communicates with each other for performing various functions of the present disclosure.

The application 104 includes a front-end such as a user interface 202 and a back-end such as server 204. The user interface 202 allows a user to submit a document, print attributes, displaying details such as cost etc. The server 204 performs several functionalities such as document submission, document conversion into printable form, cost calculation for printing the document, or the like. The application 104 may be in the form of a web application hosted on the Internet, a mobile app, a desktop application or the like. For the sake of discussion, the application 104 may be a web application such as a web portal hosted on the Internet and may be referred to as web portal 104. But the application 104 can be implemented in the form of a mobile app or a desktop application. The front-end of the application 104 i.e., the user interface 202 communicates with the server 204 to perform all functionalities of the present disclosure. For example, the user interface 202 receives all input from the user and the server 204 processes the input and returns the results to the front-end.

The user accesses the web portal 104. The user may be a registered user with the web portal or may be a guest user of the web portal 104. Upon accessing the web portal 104, a user interface 202 is provided to the user. The user interface 202 allows the user to submit a document for printing. The user may download the document from his email, cloud storage, from a USB or the like and finally submits the document for printing. The document includes one or more pages. The document may be a large document including various content types such text, image, graphics or a combination thereof. The document may be in a printable format or in a non-printable format. Various formats of the document include, but are not limited to, a Portable Document Format (PDF), Microsoft DOC format, Hypertext Markup Language (HTML) format, Extensible Markup Language (XML) format, Microsoft XLS format, and Tag Image File Format (TIFF) without limiting the scope of disclosure.

Post receiving the document, the web portal 104 further provides the user interface 202 to submit one or more print attributes. Various examples of the print attributes may include, but not limited to, a number of pages to be printed, a number of copies, black & white color, color print, single-side, double-side, staple, other finishing options or the like. The user submits details corresponding to each print attributes. For example, the number of pages may be 20, the number of copies may be 2, the type of print may be color print, the side to be considered for printing may be single-side and so on. In this manner, the user configures the document for printing by providing values to all print attributes, Post submitting these attributes, the server 204 receives the document and the print attributes. Based on the print attributes, the server 204 calculates a cost of printing the document. The server 204 then sends back the calculated cost to the web portal 104 which is displayed to the user via the user interface 202 for confirmation. The user confirms the cost. Upon receiving the confirmation, the web portal 104 further provides a user interface 202 to input payment details. The web portal 104 may be integrated with the third party payment service providers for the payment completion etc. The user input the payment details such as username, credit card number, date of expiry, CVV and so on at the web portal on his computing device 102. The server 204 then validates the payment details with the help of third party payment provider.

In more detail, the server 204 calculates the cost and assigns an authorization code to the user. The authorization code is created between the server 204 and the third party payment provider. This code is used if there any refunds to be made and to validate the payment. The server 204 then directs the user/application to the third party service provider. The third party service provider gives one or more options to the user to checkout. For example, the one or more options may be net banking, credit card, debit card, payment wallets or the like. The user provides the required details to proceed further and the third party service provider validates the user details and generates a transaction id corresponding to the user. After validation, the third party payment service provider put the payment in held state until the user prints his job at the kiosk 106. The server 204 encrypts the document with payment details. The server 204 encrypts the document with the token (with a language that only print workflow 210 can decrypt) and allows the user to download the document in the form of a print job. Once encrypted, the user downloads the encrypted print job in his personal storage device such as USB, hard disk or any storage device.

Few exemplary screenshots of the user interface are shown in FIGS. 3A-3D. According to the screenshot 300 of FIG. 3A, the web portal 104 allows the user to upload the document for printing via a browse file option 302. The browse file option 302 allows the user to select a document file present in any location and click on the upload option 304 after selecting the file/document. Once done, the web portal 104 displays a message to the user that the document is uploaded, marked as 318 in the screenshot 310 of FIG. 3B. The screenshot 310 allows the user to configure the document for printing by providing details to print attributes such as number of copies 312, double-sided 314, color options 316 or the like. The user can select or provide value corresponding to each print attribute. For example, the user can select yes or no for the print attribute double-sided 314. In another example, the user can select color or BW for the print attribute 316. Once the print attributes are submitted, the web portal 104 shows a calculated cost for printing the document, marked as 322 in the snapshot 320 of FIG. 3C, The web portal 104 further includes an option to pay using a pay button 324. Upon clicking the pay button 324, the user is re-directed to third party payment providers for validation. After the payment is validated, the web portal 104 displays a message to the user such as message 334 as shown in the snapshot 330 of FIG. 3D and further allows the user to download the encrypted document such as 332 into his any personal storage device.

After downloading the print job, the user accesses the kiosk 106 and plugs-in his personal storage device to the kiosk 106. The user then accesses the print workflow 210 running on the kiosk 106. The print workflow 210 detects the personal storage device connected to the kiosk 106 and further checks for any print job stored in the personal storage device. If found, the print workflow 210 reads the encrypted print job, retrieves the token, decrypts the encrypted job and contacts the server 204 to validates all job details. Once decrypted, the print workflow 210 retrieves all job details such as the number of pages to print, the number of copies to print, black & white print, color print, any finishing to be considered etc. In some implementations, the print workflow 210 contacts the server 204 to retrieve details such as the number of pages to print, the number of copies to print, black & white print, color print, any finishing option to be considered etc. Upon successful decryption and retrieval, the print workflow 210 directly prints the document without requiring any user intervention/input. Here, the user does not have to input any payment details, personal details, at the public kiosk 106 but used his personal device such as a computing device 102 to input payment or personal details and thereby the system 201 offers an enhanced security and comfort to the user. Before printing, the print workflow 210 optionally displays a preview of the job and waits for user confirmation.

The print workflow 210 finally prints the print job at the kiosk 106. Once the document is printed at the kiosk 106, the print workflow 210 then updates the server 204 of the actual print output and communicates with the server 204 to reconcile the charge/cost based on the actual print output. The server 204 further communicates with the third party payment provider to charge the actual amount. In this manner, the web portal 104 reconciles the cost information. For example, if the cost displayed for printing 5 pages for black and white mode is USD 5 before printing, but due to some reasons, only 3 pages are printed at the kiosk 106, then the print workflow 210 communicates with the server 204 to update the actual printed document/data. The server 204 based on actual printed document re-calculates the cost and updates the third party payment provider. The third party payment provider charges the actual cost of the printed document i.e., USD 3 and initiates any refund for the user. In this manner, the print workflow 210 reconciles and validates the actual charge based on the printed data.

In some implementations, the document may be stored at the cloud storage. The server 204 calculates the cost and assigns an authorization code to the user. The authorization code is created between the server and the third party payment provider. This code is used if there any refunds to be made and to validate the payment. The server 204 then directs the user/application 104 to the third party service provider. The third party service provider gives one or more options to user to checkout. For example, the one or more options may be net banking, credit card, debit card, payment wallets or the like. The user provides the required details to proceed further and the third party service provider validates the user details and generates a transaction id corresponding to the user. After validation, the third party payment service provider put the payment in held state until the user prints his job at the kiosk 106.

In some implementations, the server 204 automatically uploads the document to a cloud storage along with job details. The job details include payment details, personal details and other print details as discussed above. In such implementations, a code is generated and provided to the user. Post accessing the print workflow 210 at kiosk 106, the user requires to input the received code. The print workflow 210 validates the received code and automatically downloads the document at the kiosk 106 from the cloud storage. The print workflow 210 then finally prints the document without any user intervention and again contacts the server 204 for cost reconciliation.

In other implementations, a mobile app may be used to perform all functionalities as discussed above with respect to the web portal. Similarly, a desktop app may be used to perform all functionalities as discussed above with respect to the web portal.

Figure 4A:
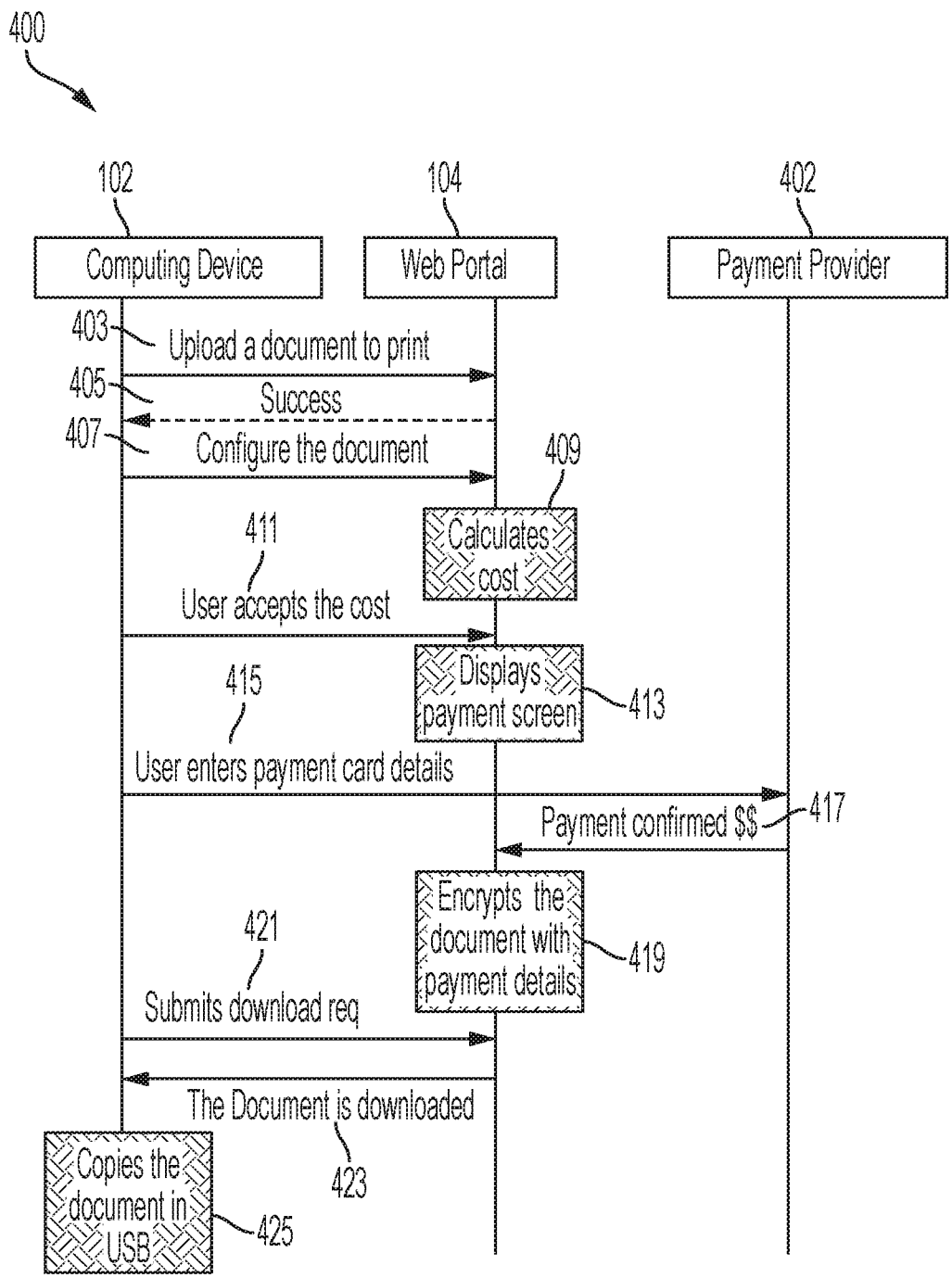
FIGS. 4A and 4B show flow diagrams for direct printing at kiosk without any user intervention.

FIG. 4A shows a flow diagram 400 illustrating flow of steps from one component to another component such from a computing device to a web portal to a third party payment provider. The flow diagram 400 includes a computing device 102, a web portal 104 hosted on the Internet and a payment provider 402. A user uses a computing device 102 to upload a document for printing (marked as 403). Upon successful uploading, the web portal 104 informs the same to the user through the computing device 102 (marked as 405). The user configures the document at the web portal 104 (marked as 407). The web portal 104 calculates a cost (marked as 409). The user accepts the cost (marked as 411). The web portal 104 then displays a payment user interface to the user (marked as 413) and is the user is redirected to the payment provider 402. The user enters the payment details at the payment provider 402 (marked as 415). The service provider 402 validates and confirms the payment (marked as 417). The web portal 104 then encrypts the document with payment details (marked as 419). The user then submits a request at the web portal 104 to download the encrypted document (marked as 421). The web portal 104 then allows the user to download the encrypted document (marked as 423). The user copies the encrypted document in a USB (marked as 425).

Figure 4B:
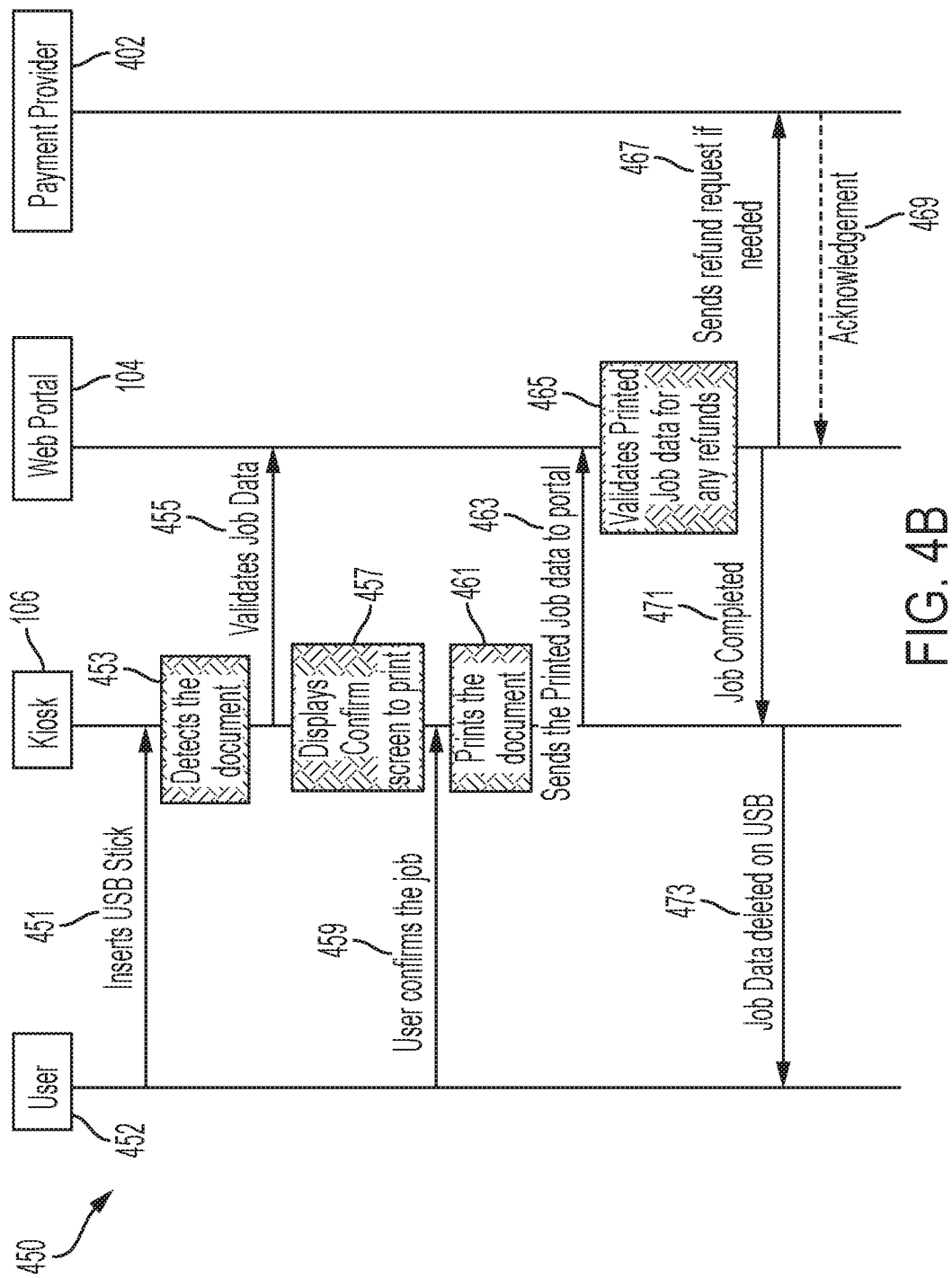

FIG. 4B shows another flow diagram 450 indicating flow of processing between a kiosk 106, a web portal 104 and the third party provider 402. The user 452 inserts the personal storage device in the kiosk 106 (marked as 451). The kiosk 106 detects the document in the personal storage device (marked as 453). The kiosk 106 contacts the web portal for validating job data (marked as 455). The kiosk 106 displays a screen to the user 452 for print confirmation (marked as 457). The user 452 confirms the print job at the kiosk 106 (marked as 459). The kiosk 106 then prints the document (461). The kiosk 106 then sends the printed job data to the web portal 104 (marked as 463). The web portal 104 then checks/validates the printed job data for any refunds (marked as 465). The web portal 104 sends refund request to the payment provider, if any (marked as 467). The payment provider 402 then acknowledges it and completes the refund request (marked as 469). The web portal 104 sends job completed status to the kiosk 106 (marked as 471). The kiosk 106 may optionally delete the print job on the USB (marked as 473).

Exemplary Flowchart

Figure 5A:
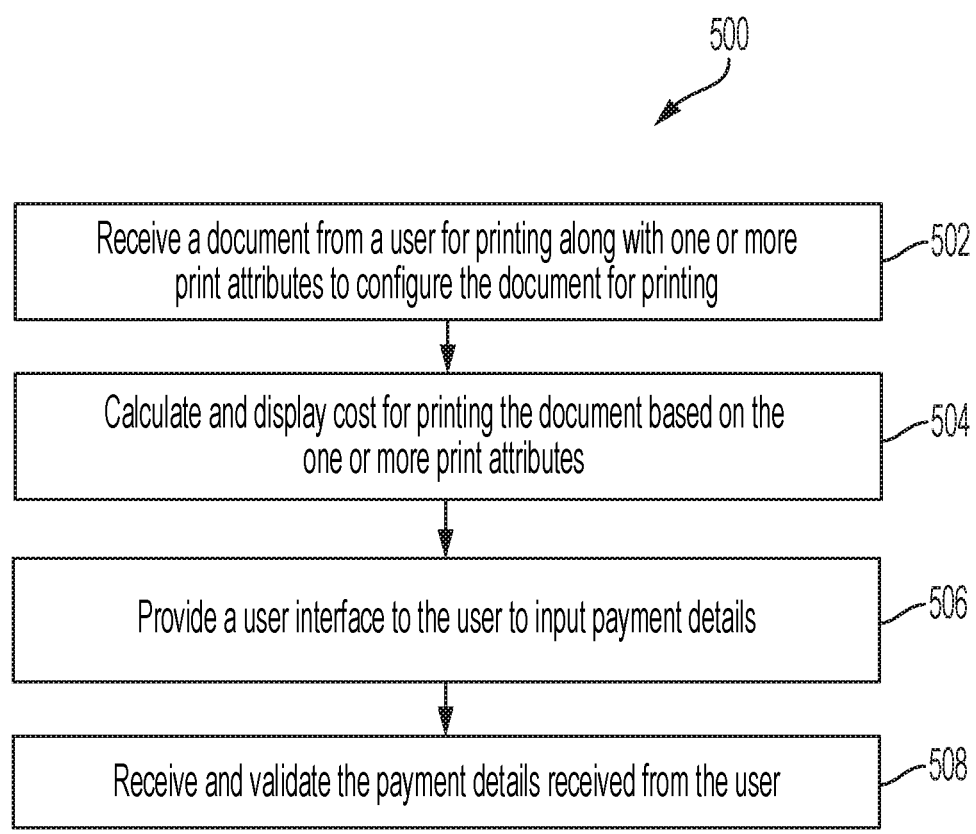
FIGS. 5A-5B represent a flowchart for direct printing at a kiosk without any user intervention.
Figure 5B:
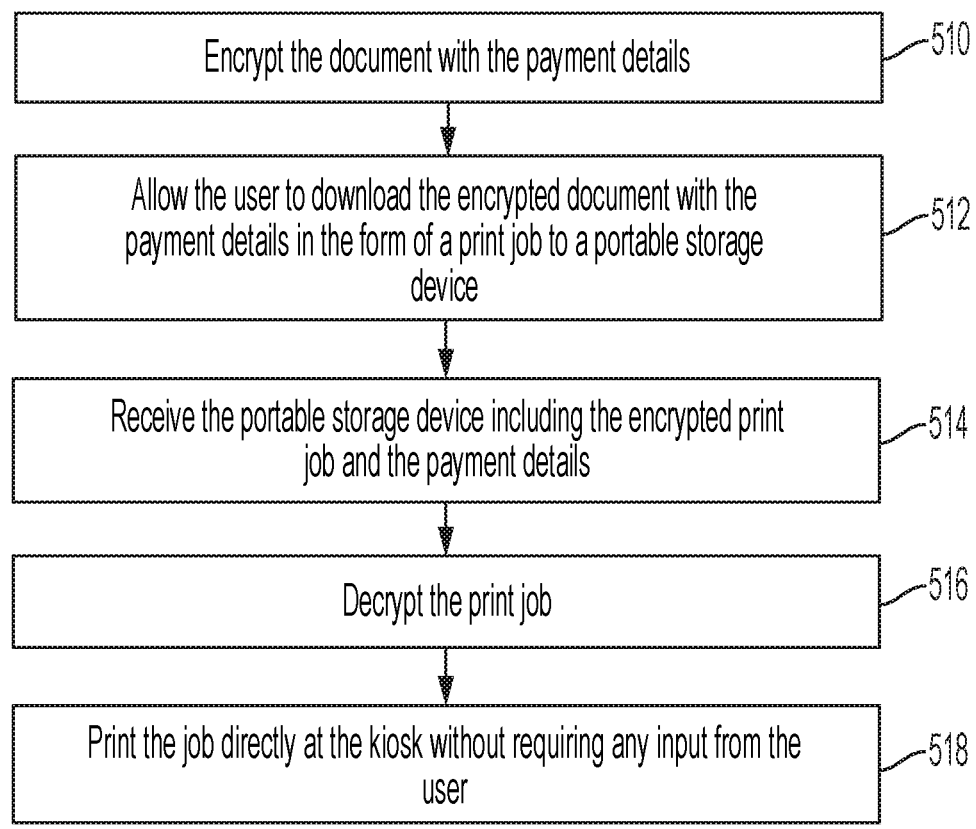

FIGS. 5A-5B illustrate an exemplary method 500 for simplified and direct printing at kiosks. The method 500 can be implemented using a combination of an application running on a computing device and a print workflow running on a kiosk. The application can be in the form of a desktop application, a mobile application, or an application running in a web browser such as a web portal. In some embodiments, the method can be implemented using a combination of an app running on a mobile device and a print workflow running on a kiosk. For simplicity, the method 500 will be discussed using web portal as an example and the print workflow running on the kiosk without limiting the scope of the disclosure. The method 500 starts when a user wishes to print a document at kiosk but without requiring any personal details or any payment details from the user at the kiosk.

At Web Portal

A user has a document which the wishes to print. The document includes content in the form of text, graphics, image or a combination thereof. The document may be a form, a certificate, a booklet, a magazine, or any kind of document. The user accesses a web portal running on the computing device. The web portal can be accessed by inputting a URL such as instantprint.com/print in a web browser. Various examples of the web browser include Internet Explorer, Google Chrome, Firefox, Safari, Opera or the like. The user submits a document for printing to the web portal. The document can be uploaded to the web portal through a personal storage device such as USB, hard disk, a location accessible to the web portal, downloaded via an email, cloud, or the like. The document can be in any format such as MS word, MS ppt, PDF, HTML, or the like The document is received at the web portal. The document is selected from USB, Google Drive, DropBox™, his local media. The user can directly import his documents from cloud services such as (Google Drive, DropBox) USB directly into the web portal. Upon receiving the document from the user, the user provides one or more print attributes to configure the document for printing. The one or more print attributes may be but not limited to, media size, number of copies, black & white, color print, staple, hole punch, or the like. The document and the print attributes to configure the document for printing are received at 502, Based on the print attributes, a cost for printing the document is calculated and displayed at 504. For example, the cost for printing the black & white pages is different from printing the document in color. Similarly, the cost for printing the number of copies vary. Post calculating the cost, the cost is displayed to the user for confirmation via a user interface.

The web portal is integrated with a payment service provider that allow the user to complete the payment details. The payment service providers may be third party service providers such as PayPal, 2CheckOut or FreedomPay or other payment gateways the like, A user interface is provided to the user to input payment details at 506. The payment details include username, card number, expiry, CVV, or the like. The user inputs the payment details which are received at the web portal. The received payment details are validated with the help of a third party service provider at 508. Once the payment details are validated, the document is encrypted with the payment details at the web portal at 510. The web portal performs the encryption using public/private key pair (token) as known or later developed methods. The web portal uses the Public Key to encrypt the Job Data (File to Print, Metadata including Job ID, # of Copies, Finishing options). The web portal signs the package using its signature. The web portal/server and the print workflow share Public/Private key pair. Before encryption, it is checked whether the document is in printable format. If not, the document is converted into printable format. For example, if the document is in MS word or any other format, the web portal converts the document into PDF format which is ready for printing.

Post encryption, the user is provided with an option to download the encrypted document in the form of a print job, at 512. The encrypted document includes all details such as payment details, job details, for example, number of copies to be printed, staple, color print etc. The user downloads the encrypted document along with payment details in the form of a print job to a portable storage device such as a USB, a hard disk, or the like. The user plugs-in the portable storage device to the computing device and stores the print job in the portable storage device. The web portal may clear the job data after the job is printed at the kiosk 106.

At a Print Workflow

This stage comes when the document is ready for printing and no input from the user is required. The user plugs-in the portable storage device to the kiosk. The kiosk receives the portable storage device including the encrypted document with the payment details at 514. The print workflow detects the portable storage device such as USB connected to the kiosk and accesses the USB for further details. The print workflow checks if there is any printable document in the USB. If found, the print workflow decrypts the encrypted print job at 516. Here, the encrypted print job is read as stored in the portable storage device and decrypted to retrieve the payment details and more job details on printing attributes such as how many copies to be printed, what type of print to be done, whether any finishing is to be done such as staple hole punch, etc. The print workflow provides a preview and wait for the user confirmation. Once decrypted, the print workflow prints the print job according to the print attributes without requiring any input from the user, at kiosk at 518. Thereafter, the print workflow contacts the web portal to reconcile the cost based on the printed document. The print workflow validates the printed job data for any refunds. For example, if the print workflow prints less number of pages than the actual number of pages to be printed, then the print workflow updates the web portal on the actual printed data. The web portal then communicates with the third party payment provider to charge the user based on actual printed data and to initiate any refund for the user.

In some embodiments, the user uploads the print job to a cloud storage instead of storing in the portable storage device. In such cases, the web portal generates a code for the print job such as job id, job ticket, QR code or any other job code. The code generated may be sent to a user personal device, email, or the like. The code may be sent to the user in the form of a picture/image. At the time of printing, the user accesses the print workflow at the kiosk. Then, the user provides the code generated. If the code is a job code or id, the user can simply provide the code at the print workflow user interface. If the code is the QR code or bar code, the user scans the code using a scan application on the kiosk. For example, the user shows the QR code or bar code to the scanner at the kiosk. The print workflow receives the code provided by the user and validates the code. Upon successful validation, the print job is downloaded from the cloud storage to the kiosk and finally printed directly at the kiosk. The print workflow updates the web portal with the document details to reconcile the cost based on the printed document.

The method 500 facilitates direct and simplified printing at kisok such that the user has to simply access the print workflow at the kiosk to print the document stored in the USB or cloud without inputting any confidential information such as payment details, personal details etc. Instead, the method 500 allows the user to input any payment details at his personal device such as computing device and then just access the kiosk for printing.

The method 500 can be implemented in the form of a non-transitory computer-readable medium including instructions executable by a processing resource. The processing resource is to: at an application accessible at a computing device: receive a document from a user for printing along with one or more print attributes to configure the document for printing; calculate and display a cost for the printing the document based on the one or more print attributes: provide a user interface to the user to input payment details; validate the payment details received from the user; encrypt the document with the payment details; and allow the user to download the encrypted document with the payment details in the form of a print job to a portable storage device; and at a print workflow running at a kiosk; receive the portable storage device comprising the encrypted print job and the payment details; read the encrypted print job stored in the portable storage device; decrypt the print job; and print the job directly at the kiosk without requiring any input from the user.

The disclosure discloses an arrangement of directing printing at kiosk such that the arrangement includes an application running on a computing device and a print workflow running on a kiosk. The application may include a front-end such as a user interface and a back-end such as a server. In some implementations, the server may not be a part of the application but may be communicatively coupled to the application for implementing the present disclosure. The arrangement is such that the user uses the application for submitting document for printing, print attributes, inputting payment details, or the like. The application and the print workflow communicate with each other in real-time for cost re-calculation, cost reconciliation, refunds, printing etc, Many other variations to the discussed arrangement can be implemented for easy, direct and simplified printing at kiosk.

The present disclosure provides methods and systems for printing at kiosks without any user intervention such that a user has to do nothing or little at kiosk to print his document. The methods and systems enhance security for the user as the methods and systems allow the user to input personal and payment details at the web portal using his personal computing device instead of providing payment details at public kiosks. This increases confidence and trust in the users as the user use their own devices for inputting the payment details, for example, computing device or mobile devices, etc. For example, the pre-payment on the web portal enhances security for the user who may not want to enter payment information on a public kiosk. The methods and systems allow monitoring of kiosks using the web portal to track usage, preferences and behaviour etc. The methods and systems allow printing at kiosks without disclosing payment details or personal details of the user. The methods and systems further simplify the workflow for the user as the user knows the cost in advance. The methods and systems provide secure and simple way of printing documents in retail kiosk environments. The methods and systems encourage the user to the use the kiosk for printing. Moreover, the methods and systems eliminate the need of CC reader in kiosks as the payment is performed out of kiosk scenario.

The present disclosure can be integrated easily with other Document Editing application.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, encrypting, validating, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus, Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for direct printing at kiosks, the method comprising:
   at an application accessible at a computing device:
      receiving a document from a user for printing and one or more print attributes to configure the document for printing;
   at a server communicatively coupled to the application:
      calculating and displaying a cost for the printing the document based on the one or more print attributes;
      providing a user interface to the user to input payment details;
      validating the payment details as received from the user;
      encrypting the document with the payment details; and
      allowing the user to download the encrypted document with the payment details in a form of an encrypted print job to a portable storage device; and
   at a print workflow running at a kiosk:
      receiving the portable storage device comprising the encrypted print job;
      reading the encrypted print job stored in the portable storage device;
      decrypting the encrypted print job; and
      upon successful decryption, printing the decrypted print job directly at the kiosk without requiring any input from the user.

2. The method of claim 1, wherein the application comprises one of: a desktop application, a mobile application, and a web application.

3. The method of claim 1, further comprising storing the payment details at the server.

4. The method of claim 3, wherein the print workflow communicates with the server to retrieve the payment details.

5. The method of claim 1, further comprising, at the server, converting the document into a printable format.

6. The method of claim 1, further comprising, at the print workflow, updating the server with the payment details to reconcile the cost based on the printing of the document.

7. The method of claim 1, further comprising, at the print workflow, validating the decrypted print job for any refund.

8. The method of claim 1, further comprising, at the application, allowing the user to upload the document to a cloud storage.

9. The method of claim 8, further comprising, at the server, generating a code for the uploaded document.

10. The method of claim 9, further comprising, at the print workflow, receiving the code from the user, before printing the decrypted print job at the kiosk.

11. A system comprising:
   an application accessible at a computing device to:
      receive a document from a user for printing and one or more print attributes to configure the document for printing;
   a server in communication with the application to:
      calculate and display a cost for the printing of the document based on the one or more print attributes;
      provide a user interface to the user to input payment details;
      receive and validate the payment details received from the user;
      encrypt the document with the payment details; and
      allow the user to download the encrypted document with the payment details in a form of an encrypted print job to a portable storage device; and
   a print workflow running on a kiosk, the print workflow to:
      receive the portable storage device comprising the encrypted print job and the payment details;
      read the encrypted print job stored in the portable storage device;
      decrypt the encrypted print job; and upon successful decryption, print the decrypted print job directly at the kiosk without requiring any input from the user.

12. The system of claim 11, wherein the application comprises one of: a desktop application, a mobile application, and a web application.

13. The system of claim 11, wherein the server converts the document into a printable format.

14. The system of claim 11, wherein the print workflow updates the server with the payment details to reconcile the cost.

15. The system of claim 11, wherein the print workflow validates the decrypted print job for any refund.

16. The system of claim 11, wherein the application allows the user to upload the document to a cloud storage.

17. The system of claim 16, wherein the server generates a code for the uploaded document.

18. The system of claim 17, wherein the print workflow receives the code from the user, before printing the decrypted print job at the kiosk.

19. A system, comprising:
an application accessible at a computing device to:
receive a document from a user for printing and one or more print attributes to configure the document for printing;
a server in communication with the application to:
calculate a cost for the printing of the document based on the one or more print attributes;
provide a user interface to input payment details;
validate the payment details received from the user;
generate a code for a print job, the print job including the document and the payment details;
upload the print job to a cloud storage; and
a print workflow running on a kiosk, the kiosk to:
receive the code from the user to access the print job; and
download and print the print job at the kiosk without requiring any input from the user.

20. The system of claim 19, wherein the print workflow updates the server with the payment details to reconcile the cost.

21. The system of claim 19, wherein the print workflow validates the print job for any refund.

22. A non-transitory computer-readable medium comprising instructions executable by a processing resource to:
at an application accessible at a computing device:
receive a document from a user for printing along with one or more print attributes to configure the document for printing;
calculate and display a cost for the printing of the document based on the one or more print attributes;
provide a user interface to the user to input payment details;
validate the payment details received from the user;
encrypt the document with the payment details; and
allow the user to download the encrypted document with the payment details in a form of an encrypted print job to a portable storage device; and
at a print workflow running at a kiosk;
receive the portable storage device comprising the encrypted print job with the payment details;
read the encrypted print job stored in the portable storage device;
decrypt the encrypted print job; and
print the decrypted job directly at the kiosk without requiring any input from the user.

23. The non-transitory computer-readable medium as claimed in claim 22, wherein the application comprises one of: a desktop application, a mobile application and a web application.

* * * * *